United States Patent [19]

Kühnemundt et al.

[11] Patent Number: 4,703,248
[45] Date of Patent: Oct. 27, 1987

[54] SWITCHING ARRANGEMENT FOR FULL-WAVE POWER CONTROL WHICH IS INSENSITIVE TO MAINS VOLTAGE FLUCTUATIONS

[75] Inventors: Gerhard Kühnemundt, Wurmlingen; Heinz Elsässer, Rietheim-Weilheim, both of Fed. Rep. of Germany

[73] Assignee: Marguardt GmbH, Rietheim-Weilheim, Fed. Rep. of Germany

[21] Appl. No.: 883,509

[22] Filed: Jul. 8, 1986

[30] Foreign Application Priority Data

Jul. 10, 1985 [DE] Fed. Rep. of Germany ....... 3524563

[51] Int. Cl.⁴ .............................................. G05F 5/02
[52] U.S. Cl. ................. 323/300; 318/345 H; 323/324; 323/327
[58] Field of Search ............... 323/300, 320, 324, 327, 323/321, 901; 315/194, 199; 318/345 H; 338/328, 330

[56] References Cited

U.S. PATENT DOCUMENTS

| | | | |
|---|---|---|---|
| 3,634,874 | 1/1972 | Mason | 318/345 H |
| 3,872,374 | 3/1975 | Rasmussen | 323/300 |
| 4,031,458 | 6/1977 | Ichikawa | 323/324 |

FOREIGN PATENT DOCUMENTS

| | | | |
|---|---|---|---|
| 2325256 | 12/1974 | Fed. Rep. of Germany | 323/300 |
| 2608489 | 9/1976 | Fed. Rep. of Germany | 323/324 |
| 58-862 | 4/1983 | Japan | 323/324 |

OTHER PUBLICATIONS

"Thyristoren und Triacs", Ing. Heinz Richter, Franckh'sche Verlagshandlung W. Keller & Co., 1969, pp. 52 and 53.
"Halbleiter-Schaltungstechnik", U. Tietze and Ch. Schenk, Springer-Verlag, 1971, pp. 577 et seq.

Primary Examiner—William H. Beha, Jr.
Attorney, Agent, or Firm—Spencer & Frank

[57] ABSTRACT

A switching arrangement for full-wave power control comprising a triac (2), the control electrode of which is preceded by a trigger diode, the control voltage being taken from an RC section having at least one potentiometer (9), which effects a phase shift in the firing time as a function of the position of the potentiometer (9), is improved by the RC section (9, 10) being connected to a constant voltage source. This consists of two Z diodes (6) which are connectd in opposition and which are advantageously bridged by means of an adjustable voltage divider (7, 8), in such a manner that the RC section (9, 10) is connected to an adjustable part voltage. Instead of bridging the triac (2) for full drive, as usual, the trigger diode (11) is connected to a special bias resistor by means of a switch (13). According to a preferred embodiment, the resistors of the switching arrangement consists of a low-temperature thick-film paste printed on a hard paper board (see drawing relating to this).

4 Claims, 2 Drawing Figures

SWITCHING ARRANGEMENT FOR FULL-WAVE POWER CONTROL WHICH IS INSENSITIVE TO MAINS VOLTAGE FLUCTUATIONS

BACKGROUND OF THE INVENTION

The invention relates to a switching arrangement for full-wave power control comprising a triac, the control electrode of which is preceded by a trigger diode, the control voltge being taken from an RC section having at least one potentiometer, which, as a function of the position of the potentiometer, effects a phase shift in the firing time. Such circuits are used, for example, for controlling the brightness in lighting systems or for adjusting the rotational speed, particularly of electric tools.

Firing circuits for triacs as full-wave power controllers are known, for example from "Halbleiter-Schaltungstechnik" (Semiconductor Circuit Engineering, U. Tietze and Ch. Schenk, Springer-Verlag, 1971, pages 577 at seq. or from "Thyristoren und Triacs" (Thyristors and Triacs), Ing. (grad.) Heinz Richter, Franckh'sche Verlagshandlung W. Keller & Co., 1969, page 52 and 53. The efforts to improve such switching arrangements were previously mainly directed towards reducing the switching hysteresis. However, in series production the main disadvantage which becomes noticeable is that the angle of current flow is highly dependent on mains voltage, with a particular potentiometer setting. For this reason, it is difficult to calibrate the circuit, even before installation into, for example, a hand-drill, in such a manner that the armture of the motor is audibly rotating in the drilling start position of the potentiometer (largest resistance which can be set), but, on the other hand, is still rotating as slowly as is desirable to start drilling. Incidentally, the development of solutions free of switching thyristors has led to relatively elaborate switching arrangements with many individual components.

SUMMARY OF THE INVENTION

The invention is based on the object of creating a firing circuit which operates to a high degree independently of the mains and in which low power losses occur and which can be produced in miniature construction.

Starting with a switching arrangement of the type explained in the introduction, this object is achieved in accordance with the invention by the RC section being connected to a constant voltage source. This preferably consists of two Z diodes which are connected in opposition, in series with a bias resistor, and is connected in parallel with the triac. In this manner, one and the same switching arrangement can be used with virtually the same range of settings of the current flow angle for different mains voltages, for example for 220 and 240 V or for 110 and 127 V.

However, the Z voltage is not always the same for commercially available Z diodes. Z diodes having a rated voltage of 62 V can have, for example, actual Z voltages of from 58 to 67 V. In order to be able to dispense with selection during mass production, it is proposed that the Z diode is bridged by means of an adjustable voltage divider and the RC section is connected to the part voltage. The voltage divider can thus be used for calibrating the Z voltages of differing manufacature. But not only this. The firing voltages of trigger diodes are also different from item to item due to manufacturing influences. This undesirable phenomenon is also compensated for by the adjustable voltage divider, by using it for setting a quite particular angle of current flow with a particular potentiometer position.

Since phae control systems basically only achieve a much lower current flow angle than 180°, it is known to bridge the triac by means of a switch for full drive. But this switch carries the full load current. In further development of the invention, it is therefore proposed that the bias resistor of the Z diodes consists of two series resistors, the connecting line of which can be connected by means of a switch to the input of the trigger diode. This switch, which connects the trigger diode by a relatively small bias resistor of, for example, 10 kΩ to one mains voltage connection of the circuit arrangement, effects an extensively full drive of the triac, even though it carries only a small current itself and can be constructed to be correspondingly smaller.

To simplify operation, it is proposed that a common actuating member is provided for the potentiometer and the switch, in such a manner that, after the potentiometer position of least resistance has been reached, the bridging switch is closed in the same direction of actuation. In addition, the common actuating member can also act, as is known per se, on the mains switch, at the other end of its range of movement.

Another advantage of the proposed switching arrangement consists in that the ratio of the values of Ohms of the smallest and of the largest resistance is only about 1:10. For this reason, it is proposed that the resistors consist of a low-temperature thick-film paste, comprising mixed components of carbon and lacquer, and are printed on a board of hard paper, which also carries the other switching elements and connects them with each other by means of conductor tracks. Preferably, one and the same thick-film paste can be used as base in thick-film engineering, the use of simple, common hard paper entails considerable reduction in costs.

BRIEF DESCRIPTION OF THE DRAWING

In the text which follows an examplary embodiment of the invention if explained with the aid of the drawing, in which.

DESCRIPTION OF THE PREFERRED EMBODIMENTS

Figure 1:
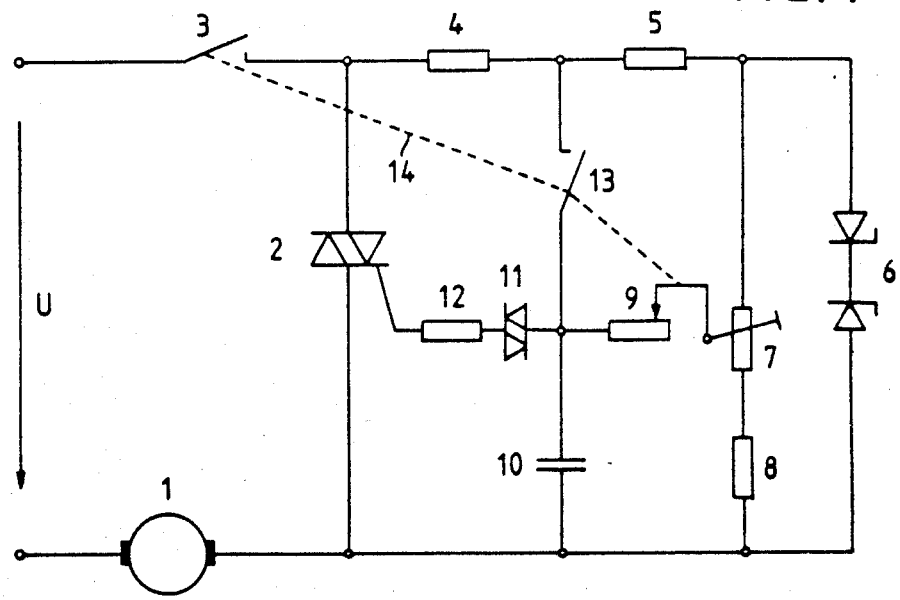
FIG. 1 shows a circuit diagram.

According to FIG. 1, the armature 1 of an electric motor is connected in series with a triac 2 and an on-switch 3 to an alternating voltage U of the usual supply frequency. Another series circuit is located in parallel with the triac 2. Beginning at the connecting line of the on-switch 3 to the triac 2, it consists of a resistor 4 of 10 kΩ, a resistor 5 of 47 kΩ and two Z diodes 6, connected in opposition, having a Z voltage of about 62 V. The Z diodes are connected to a voltage divider consisting of an adjusting resistor 7 of 47 kΩ and a resistor 8 of 100 kΩ. Between the tap of the adjusting resistor 7 and the connecting line of the triac 2 to the armature 1, an RC section is inserted which consists of a potentiometer 9 of 50 kΩ and a capacitor 10 of 0.1 μF. The connecting line of these two components of the RC section orms the control point. It is connected via a trigger diode 11 with a firing voltage of about 23 V and a resistor 12 of 27 Ohms to the control electrode of the triac 2. This resistor effects a firing delay to protect the triac against firings which start too spontaneously. In addition, a bridging switch 13 is connected between the control point and the connecting line of the two resistors 4 and 5. The on-switch 3, the adjusting member of the potentiometer 9 and the bridging switch 13 can be moved by means of a common actuating member insuch a manner that, with the same direction of movement, first the on-switch 3 is switched on, then the potentiometer is moved from its position of highest resistance to the position of lowest resistance and, finally, the bridging switch 13 is closed, or conversely. This effective mechanical connection is indicated by means of a dashed line 14.

Since the characteristic values of the components used have manufacturing-related deviations from the nominal value, within the tolerance limits, each individual circuit arrangement is subjected to a test and adjustment at the end of the production cycle, the adjusting resistor 7, with a particular potentiometer setting, being adjusted in such a manner that the angle of current flow of the triac 2 has a particular value corresponding to a particular power level which is then maintained even within relatively large fluctuations of the mains voltage.

The relationship between the power consumed by the load and the potentiometer setting can be changed by a resistor, not shown, which is in parallel with the potentiometer.

Figure 2:
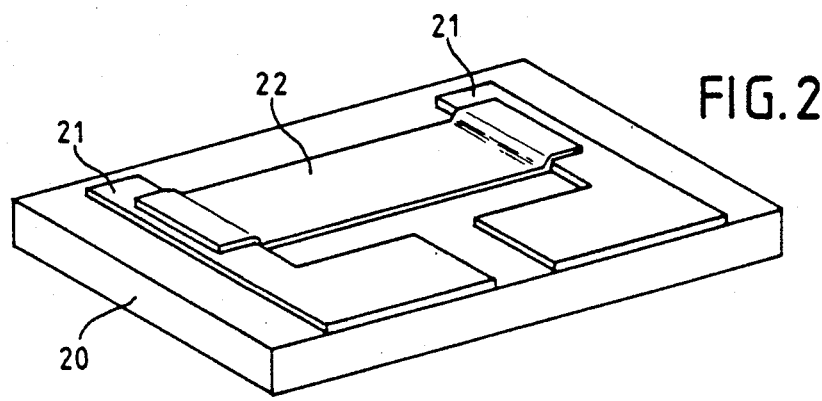
FIG. 2 shows a spatial representation of a printed circuit comprising a thick-film resistor.

FIG. 2 gives an example of the practical construction of the circuit arrangement with respect to the resistors used. On a base 20 of simple hard paper, two L-shaped line tracks 21 are mounted, the opposing legs of which are used as connecting surfaces. The two parallel legs of these line tracks 21 are bridged by a rectangular thick-film 22 which forms a resistive impedance. The value in Ohms is obtained from the cross-section and the length of the film and from the composition of the thick-film paste of which it consists.

We claim:

1. Switching arrangement for full wave power control of a load connected to an alternating voltage source, said arrangement comprising: a triac having a main current flow path for connection in series with the load and source, and a control electrode; first and second resistors connected together in series and two oppositely poled Zener diodes connected in series with said first and second resistors, said first and second resistors and said two Zener diodes forming a first series circuit which is connected in parallel with said main current flow path of said triac; a voltage divider composed of a variable resistor with a movable tap and a third resistor, said voltage divider being connected in parallel with said two Zener diodes; firing delay means composed of a potentiometer and a capacitor, said potentiometer being connected to said tap of said variable resistor and said capacitor being connected between said potentiometer and a point of connection between said Zener diodes and said triac; and a second series circuit composed of a diac and fourth resistor, said second series circuit having a first end connected to a point of connection between said capacitor and said potentiometer and a second end connected to said control electrode of said triac.

2. Switching arrangement according to claim 1, characterized in that at least said first, second, third and fourth resistors each consist of a low-temperature thick-film paste (22) comprising mixed components of carbon and lacquer and are printed onto a hard-paper board (20).

3. Switching arrangement as defined in claim 1 further comprising a switch having a first terminal connected to the point of connection between said capacitor and said potentiometer and a second terminal connected to a point of connection between said first and second resistors.

4. Switching arrangement according to claim 3, further comprising a common actuating member connected to said potentiometer (9) and said switch (13), in such a manner that after the potentiometer position of least resistance has been reached the switch is closed in the same direction of actuation.

* * * * *